June 23, 1925.
J. M. LEA
1,543,017
STORAGE BATTERY
Filed Sept. 7, 1920
2 Sheets-Sheet 1
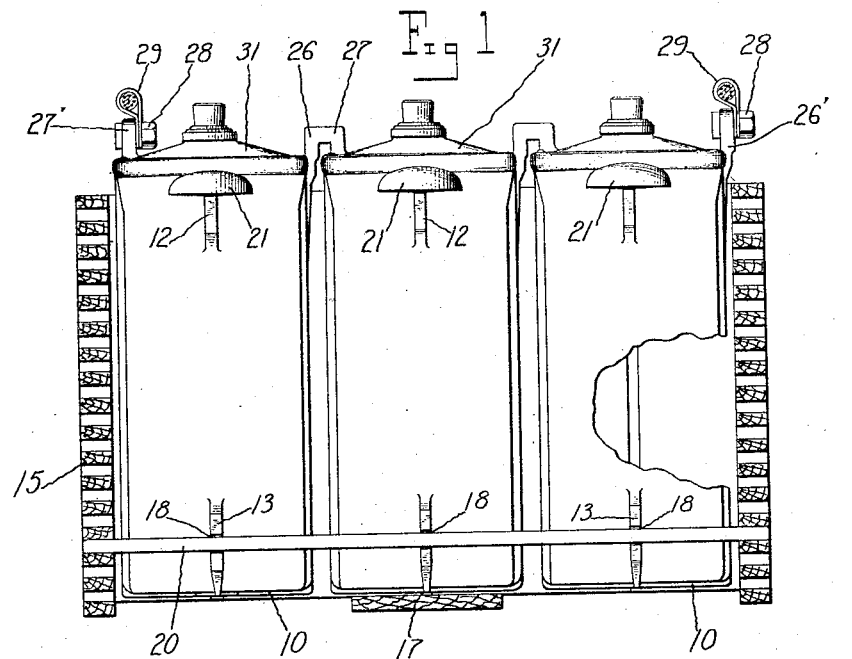
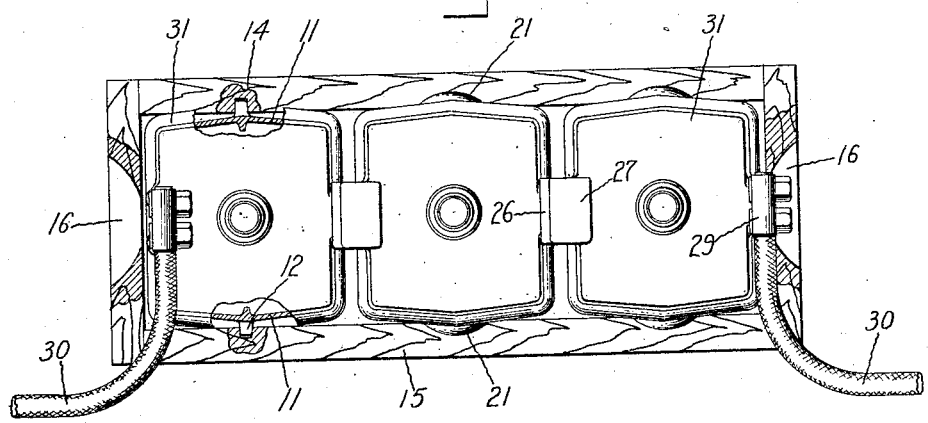
Inventor
John M Lea
By Attorneys
Blackmore, Spencer & Flint June 23, 1925.
J. M. LEA
1,543,017
STORAGE BATTERY
Filed Sept. 7, 1920 2 Sheets-Sheet 2
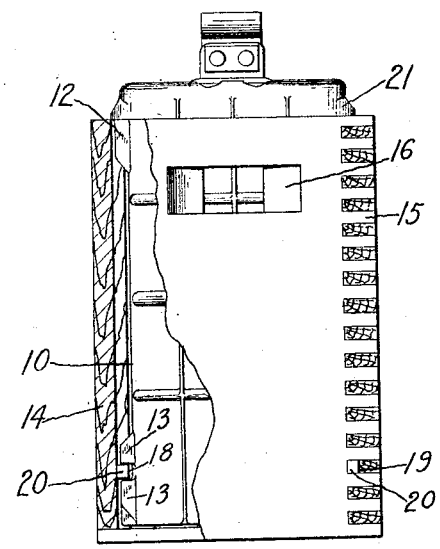
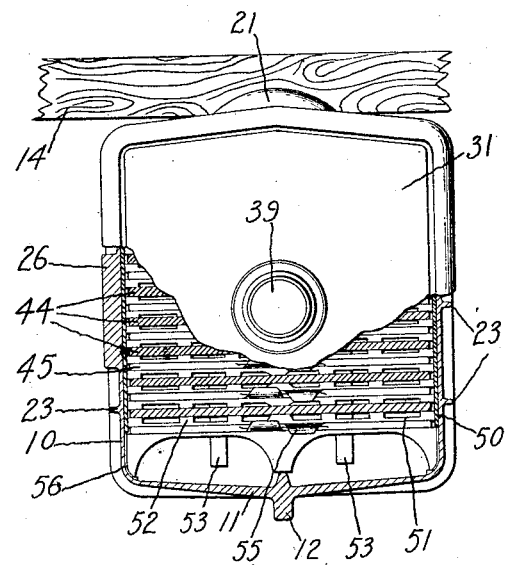
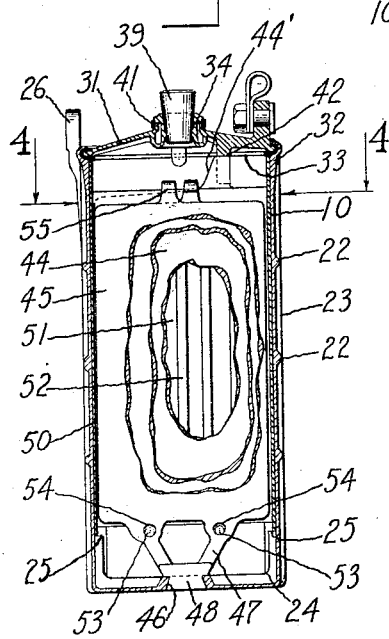
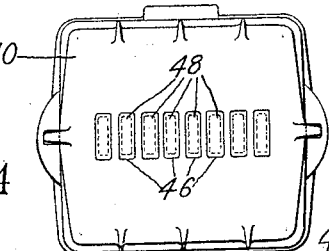
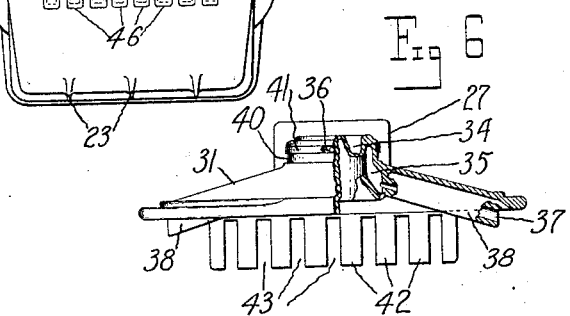
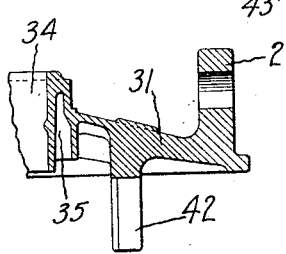
Inventor
John M. Lea
By Attorneys
Blackmore, Spencer & Flint Patented June 23, 1925.

1,543,017

UNITED STATES PATENT OFFICE.

JOHN M. LEA, OF DETROIT, MICHIGAN, ASSIGNOR TO GENERAL MOTORS CORPORATION, OF DETROIT, MICHIGAN, A CORPORATION OF DELAWARE.

STORAGE BATTERY.

Application filed September 7, 1920. Serial No. 408,749.

*To all whom it may concern:*

Be it known that I, JOHN M. LEA, a citizen of the United States, and a resident of Detroit, county of Wayne, and State of Michigan, have invented certain new and useful Improvements in Storage Batteries, of which the following is a full, clear, concise, and exact description, such as will enable others skilled in the art to which the invention relates to make and use the same, reference being made therein to the accompanying drawings, which form a part of this specification.

The invention relates to storage batteries, and more particularly to those of the lead-sulphuric acid type, and is of especial utility in connection with portable storage batteries such as are commonly employed in supplying current for ignition, starting, and lighting in connection with the operation of motor vehicles. Many features of the invention, however, are of general application in portable storage batteries for whatever use they may be designed and also in permanent installations such as light and power plants, and, in fact, wherever the lead storage battery may be employed.

The invention has for its object the provision of an improved battery cell in which the usual battery jar of glass, hard rubber, or similar insulating material is replaced by a metallic container connected with one set of battery plates and forming a part of the electric circuit.

Another object of the invention is to provide an improved means of connecting and supporting one set of battery plates by and through the battery jar itself.

A further object is the provision of a novel form of battery jar cover, by means of which the plates of the other set are connected and supported and whereby the jar is permanently closed and sealed.

A further object is the provision of improved means for connecting, supporting and housing the jars forming the cells of a multiple-cell battery.

With the above and other objects in view, as will hereinafter more fully appear, the invention comprises the novel features of construction hereinafter described and set forth in the claims hereto appended.

In the accompanying drawings in which is illustrated one embodiment of my invention—

Fig. 1 is an elevation of a portable storage battery comprising three cells, the container being shown in section.

Fig. 2 is a plan view of the same, parts being sectioned to show details.

Fig. 3 is an end elevation of the battery, the container being cut away in part.

Fig. 4 is a plan view on an enlarged scale showing one of the cells, the cell being sectioned in part on line 4—4 of Fig. 5.

Fig. 5 is a vertical section through one of the cells.

Fig. 6 is an elevation of the jar cover, parts being broken away.

Fig. 7 is a plan view of the bottom of one of the jars, and Fig. 8 is a detail of the cover showing a stage in its manufacture.

In the drawings, 10 indicates the battery jar which is preferably cast of an electrolyte-resisting conducting material such as lead or a lead alloy. The jar is generally of rectangular form with the sides which are designed to lie adjacent to the battery box or container somewhat expanded as shown at 11 and provided at the apex of the expanded portion with ribs 12 and 13, adapted to engage in grooves 14 in the battery box 15. The box, which may be constructed of wood in the usual or any suitable manner, may have the ends cut away as at 16 to provide hand-holds, and may be left open at the bottom or the bottom may be of skeleton construction as indicated at 17. The grooves 14 extend from top to bottom of the sides of the box so that the ribs 13 on the jar may slide therein to a position adjacent to the bottom of the box. The ribs 13 are cut away at a point intermediate their ends to form a notch 18 and horizontal grooves 19 are formed in the side walls of the box or container in which strips 20 may be inserted after the jars have been lowered into place. These strips, when in position, are designed to fit closely in the notches 18 and thereby prevent vertical movement of the jars with reference to the box. A lug 21 is formed on the side of the jar at the upper end of the rib 12 which may rest upon the side of the box as shown in Fig. 3 thereby supporting or suspending the jar within the box.

It will be seen that with the lugs resting on the sides of the box, the ribs 12 and 13 engaging in the grooves 14, and the strips 20 in locking position in the notches 18, the jars will be firmly held against displacement in any direction relatively to the box. Furthermore this result will be attained with a minimum amount of inter-engaging surfaces, the only surfaces of the jar brought into engagement with the box being the sides of the ribs 12 and 13 and the shoulders on the lugs 21. It will be noted that the jars do not touch the bottom of the box, and that the projecting or expanded formation of the sides of the jar aids in the spacing of the jar away from the sides of the box. The housing and supporting means described therefore provides an air space substantially entirely surrounding the jars and insuring adequate ventilation and insulation.

In order to reduce the weight of the battery the walls of the jar will be formed as thin as is practicable. Additional strength and rigidity may be obtained by the provision of ribs 22 and 23, the former being arranged circumferentially of the jar and the latter longitudinally thereof. The bottom of the jar may also be made more rigid by the provision of interior ribs 24, which may be continued a short distance up the sides of the jar to form ledges 25.

A lug 26 is formed integrally with the jar at a convenient location preferably at the top, to provide electrical connection between the jar and an adjoining jar in a battery. As shown in Fig. 1 the cover of the adjoining jar is provided with a corresponding lug 27 and the two lugs are connected in any suitable manner, preferably by an integrally cast connection formed by burning. The end lugs, as 26', 27', on the jar and cover respectively, may be perforated for the passage of bolts 28 by means of which clamps 29 for the conductor leads 30 may be secured in conducting relation to the lugs.

The top of the jar is closed by a cover member 31 which may be of the same material as the body of the jar and may be of the form illustrated in Fig. 6. The upper edge of the jar is provided with a seat 32 and the outer edge of the cover is appropriately shaped to engage in said seat. An insulating gasket 33, which may be of rubber or similar material, is so located as to prevent contact of the edge of the cover with the seat. When the gasket is of soft rubber, as a flexible rubber band, it will be formed of normally smaller periphery than the cover. In order to apply the gasket it may be stretched and placed over the edge of the cover and then released, when, owing to its resilience, it will take the form of the edge and be retained thereabout. The cover may then be placed on the jar and the upper edge of the jar turned or spun over, as shown, in order to hold the cover and gasket firmly in assembled relation, thus forming a permanent, insulated, and liquid-tight joint.

In the manufacture of the cover 31 it will be formed with a central aperture 34, an annular channel 35, a passage 36 leading from said channel to the exterior of the cover, and two passages 37 leading in opposite directions from the channel to the sides of the cover. The passages 37 are formed in thickened portions or ribs 38 on the interior of the cover and are so positioned as to form communicating passages to the channel 35 from points near opposite sides of the jar so that gas may escape through these passages, or through one of them if the jar should be in a tilted position, to the channel 35 and therefrom through aperture 36 to the exterior. Any electrolyte which may obtain access to the gas outlet passages will also be permitted to drain therefrom through one or more of the passages 37, thereby preventing blocking of the escape of gas by the electrolyte. The walls of the channel 35 may be formed originally cylindrical and parallel at the lower edges, as shown in Fig. 8, for convenience in casting, and may then be bent over and by a burnishing process be substantially joined thereby forming the enclosed channel as shown in Fig. 6.

The aperture 34 is designed to receive the stopper 39, which may be of rubber or other suitable material. A cylindrical surface 40 is provided around the exterior of the cover through which the aperture 36 opens, and a rubber band 41 or similar device may be mounted upon the cylindrical surface to permit the escape of gases from the jar and prevent evaporation of electrolyte or the entrance of foreign matter.

On the lower side of the cover and integral therewith are a plurality of lugs 42 forming therebetween the slots 43. The slots correspond in number and position to the number and position of the plates 44, which will ordinarily be the positive plates, intended to be assembled in the cell, and the plates are provided with lugs 44' adapted to fit closely in the said slots. In the assembling of these parts the cover and positive plates will be held in proper relative positions in a suitable jig with the lugs 44' seated in the slots 43. The plates will then be secured to the cover by fusion in the manner ordinarily employed in the process of lead burning thus forming the series of positive plates together with the cover into an integral structure.

The other set of plates indicated at 45 which will ordinarily be the negative plates, are preferably secured in conducting relation to the jar 10. The manner in which this connection is obtained may be varied, but I prefer to mount the individual plates upon the walls of the jar by means assuring an integral connection, as by burning the plates to the jar.

It will be noted that this mounting of the plates provides for the connection of one set of plates to its conducting terminal at the end of the electrolyte space opposite to that at which the other set of plates is connected to its terminal as distinguished from the usual mounting in which the terminals are connected to both sets of plates at the top. As a result the path of the current through any given portion of the cell includes the same combined length of plates as through any other portion, and the internal ohmic resistance and as a result the electrolytic action is therefore rendered substantially uniform, throughout the area of the plates.

In Fig. 7 is shown a series of apertures or slots 46 in the bottom of the jar 10, which apertures will be preferably of dove-tail form as shown in Fig. 5. Each plate 45 is provided with arms 47 extending from the lower edge of the plate downwardly in the direction of a corresponding slot 46, which arms may be bridged as shown and provided with a projection 48 adapted to be positioned in the slot 46. The plates may be held in a jig and the jar properly positioned with reference thereto, after which, by a suitable burning operation, the projecting portions 48 may be integrally secured to the jar.

Upon the inside of the jar contiguous to the parallel sides are situated plates 50 of insulating material which may be supported upon the ledges 25 constituted by the upper ends of ribs 24. These plates serve to prevent contact of the positive plates 44 with the walls of the jar. Separator plates 51 also of insulating material, for example of suitably treated wood, are arranged between adjacent battery plates. These separator plates are provided with vertical ribs 52, on the faces adjoining the positive plates, whereby vertical channels are formed, thus facilitating the escape of gas and circulation of the electrolyte. For the support of the separator plates I have provided rods 53 extending through apertures 54 in the arms 47, which rods may be of treated rattan or other insulating material. It will be noted that the separator plates will be supported above the bottom of the jar, and that they extend slightly below the lead plates, therefore offering no obstruction to the circulation of electrolyte or collection of sludge in the bottom of the jar.

Upon the upper edges of the plates 45 are formed lugs 55 which may be bent over the edges of the separator plates to retain them in the proper position in case of withdrawal of the positive group of plates.

The jar is preferably made of sufficient width to accommodate the number of plates which it is intended to place therein without completely filling the jar thereby providing additional electrolyte capacity. As shown in Fig. 4 a considerable space is left between the end negative plates 45 and the sides of the jar, this space being rendered larger by the expansion of the jar at 11. A grooved filler block 56, which may be of material similar to that of the separator plates, is placed in this space in order to hold the plates properly assembled.

It will be seen that I have provided a structure peculiarly adapted to withstand rough usage and the shocks incident to the ordinary service of a portable battery. The two sets of plates are rigidly held in position by connection to the jar and cover respectively and are also laterally supported and spaced by the separators and filler blocks, thus obviating liability to buckling and internal short-circuiting. The use of lead jars in place of the rubber or glass containers hitherto commonly employed, reduces expense and eliminates breakage. The jar as described provides practically a liquid-tight enclosure for the electrolyte and still permits the ready escape of gases, while the parts of opposite polarity are effectually insulated from each other. Finally, the devices whereby the individual cells may be mounted in battery boxes or the like affords a convenient and highly efficient means for securely retaining the jars and related parts in assembled relation.

While I have disclosed herein for purposes of illustration one embodiment of my invention it will be understood that various changes in details of construction may be made without departing from the spirit or scope of the invention as set forth in the following claims.

I claim:

1. In a battery cell, a metallic jar having apertures in a wall thereof and metallic supports for active material having lugs extending through said apertures, said lugs being secured to the said walls by fusion of the metallic material on the exterior of the jar around the apertures.

2. In a battery cell, a metallic jar, a metallic cover therefor, the edge of said jar being turned or crimped over the edge of the cover, and insulating material secured in position between said cover and said jar.

3. In a battery cell the combination of a jar and a cover sealed thereto, said cover having an aperture adjacent to the central portion thereof, adapted to permit the escape of gas from the interior and passages in said cover leading from said aperture to points adjacent to the sides of said jar.

4. In a battery cell, the combination of a jar and a cover sealed thereto, said cover having an annular portion provided with a gas-escape aperture leading to the exterior, and a resilient band surrounding said annular portion and covering said aperture.

5. In a battery cell, the combination of a jar provided with an internal shoulder forming a seat, a cover the edge of which is supported upon said seat, and insulating means between the edge of said cover and said seat comprising a resilient band of such size as to require to be stretched to place it over the edge of said cover, the edge of the jar being flanged over the edge of the cover but insulated therefrom by said band.

6. In a battery cell, a metallic cover having a filling aperture and an annular channel therein around said aperture formed between turned-over flanges on the inner face of the cover and passages leading to said channel from the inner side of the cover adjacent to the edges thereof and to the exterior.

7. In a battery cell the combination of a jar and a cover sealed thereto, said cover provided with a central opening, an annular channel separate from and surrounding said opening, a gas-escape aperture leading to the exterior, and a plurality of passages leading from said channel to points oppositely disposed and near the sides of the jar.

8. In a battery cell the combination of a jar formed of conducting material, a set of plates secured thereto, a cover of conducting material, a second set of plates carried thereby and separators of insulating material between successive plates of opposite polarity, the plates of one set having means engaging over the upper edges of the separators to retain them in position while permitting withdrawal of the plates of the other set.

9. In a battery cell, a jar having two sides parallel and the other two sides laterally expanded whereby additional space for electrolyte is provided, such space being normally filled with electrolyte and filler blocks in said space to support the battery plates.

10. In a battery cell, a jar having two sides parallel and the other two sides laterally expanded, said expanded portions being provided with vertically extending exterior ribs.

11. In a device of the class described the combination of a container provided with a vertical groove and a horizontal groove, a jar having a rib adapted to project into said vertical groove and slide therein, and a locking means insertible into said horizontal groove after the rib is psitioned in said vertical groove and adapted to interlock with said rib to prevent relative movement of said jar and container.

12. In a device of the class described, the combination of a container having a vertical groove and a horizontal groove, a jar having a rib adapted to enter said vertical groove and slide therein during the insertion of the jar into the container and a lug adapted to rest on said container and thereby support the jar in said container, and locking means adapted to lie in said horizontal groove in engagement with said rib to prevent relative movement of said jar and container.

13. In a device of the class described the combination of a container having a series of vertical internal grooves, a plurality of jars having lugs adapted to rest on the sides of said container to thereby suspend said jars within said container, and having ribs adapted to enter said vertical grooves, and slide therein and a single locking means insertible into engagement with said ribs adapted to prevent vertical movement of said jars in said container.

In testimony whereof I affix my signature.

JOHN M. LEA.